(12) United States Patent
Iden

(10) Patent No.: US 6,516,526 B1
(45) Date of Patent: Feb. 11, 2003

(54) POCKET TRANSIT

(75) Inventor: Marlin D. Iden, Riverton, WY (US)

(73) Assignee: The Brunton Company, Riverton, WY (US)

( * ) Notice: Subject to any disclaimer, the term of this patent is extended or adjusted under 35 U.S.C. 154(b) by 0 days.

(21) Appl. No.: 09/686,488

(22) Filed: Oct. 10, 2000

(51) Int. Cl.$^7$ ............................................. G01C 17/10
(52) U.S. Cl. ........................ 33/355 R; 33/1 E; 33/273
(58) Field of Search ............................... 33/355 R, 1 E, 33/1 CC, 333, 334, 340, 341, 343, 344, 346, 347, 364, 355 D, 272, 273, 275 R

(56) References Cited

U.S. PATENT DOCUMENTS

| | | | | |
|---|---|---|---|---|
| 997,222 A | * | 7/1911 | Wainwright | 33/272 |
| 1,468,368 A | * | 9/1923 | Morgan | 33/273 |
| 1,571,697 A | * | 2/1926 | Bernegau | 33/273 |
| 1,936,846 A | * | 11/1933 | Leupold | 33/273 |
| 3,191,306 A | * | 6/1965 | De Valera Kierans | 33/273 |
| 4,138,826 A | * | 2/1979 | Inge | 33/273 |
| 4,158,260 A | * | 6/1979 | Benger et al. | 33/272 |
| 4,175,333 A | | 11/1979 | Kramer | 33/344 |
| D290,093 S | | 6/1987 | Kramer et al. | D10/68 |
| 4,700,490 A | | 10/1987 | Kramer et al. | 33/355 D |
| 4,899,453 A | * | 2/1990 | Bhat et al. | 33/272 |
| 6,145,209 A | * | 11/2000 | Chang | 33/355 R |

* cited by examiner

*Primary Examiner*—Christopher W. Fulton
(74) *Attorney, Agent, or Firm*—Webb & Lewis LLC; Glenn L. Webb

(57) ABSTRACT

A transport for measuring strikes and dips. The transport includes a locking mechanism for locking the needle assembly n place. The needle assembly can be momentarily released to allow a measurement to be made, and then locked to allow the measurement to be viewed. The transport also includes external levels to allow a user to level the transit while viewing from the sides or underside. Another unique feature includes clinometer dials incorporated on the hinge between the cover and transit body.

38 Claims, 3 Drawing Sheets

POCKET TRANSIT

FIELD OF THE INVENTION

This invention belongs to the field of magnetic compasses and particularly to the field of pocket transits.

BACKGROUND OF THE INVENTION

Geological structures are represented by their angle with three orthogonal axes, including two horizontal references and a vertical axis. The horizontal references are typically referred to on maps as Latitude and Longitude (North—South, East—West) and are read relative to a compass direction (North, South, East, West) in units of degrees from zero to three hundred sixty. The vertical reference is simply the angle measured from the horizontal plane while in the vertical plane. This angle ranges from zero to ninety. Geologists typically orient structures with reference to the horizontal ("strike") and the vertical ("dip"). Pocket transits are the traditional tools to enable geologists, surveyors, miners, engineers, foresters and other geoscience professionals to obtain the strike and dips of geologic structures.

Pocket transits were originally invented by Canadian mining engineer D. W. Brunton in 1894 as a simple, rugged lightweight tool for basic surveying and geological map making, particularly for use in remote areas. There have been a number of improvements to the design of pocket transits in recent years but the pocket transit still consists primarily of a rugged field compass and an accurate inclinometer mechanism. These two devices combined together in the pocket transit are still the primary tools by which measurements of strike and dip of geologic structures. Pocket transits are essential geoscience instruments for use by geology, surveying and mapping professionals.

At their most basic, a pocket transit will include a magnetic needle that always seeks magnetic north, a perimeter divided into degrees based on either azimuth (zero to three hundred sixty) or quadrants (NE, SE, NW, SW) of ninety each; a fold-out sighting arm that defines the long axis for use as a sighting instrument; a bull's eye level to assure that the transit is being held level for accurately measuring the strike of an object; an inclinometer level for measuring angles within a vertical plane.

Presently, pocket transits, such as those manufactured by the assignee of the present invention, The Brunton Company of Riverton, Wy., include a magnetic compass having a needle and magnet assembly mounted on a jewel bearing; a needle lift mechanism that lifts the needle off the pivot when the case is closed to prevent damage during transit; magnetic damping of the compass needle to speed up readings; a pair of sights and a mirror for prismatic inline sighting for accuracy; adjustment for magnetic declination; a bubble level to assure accurate measurement of strikes; an inclinometer with a cylindrical bubble level for dip measurements and other features. Many of these features are disclosed in U.S. Pat. Nos. 4,700,490; 4,175,333; and D290,093, all assigned to the assignee of the present invention.

As useful as these previous transits are, there are a number of difficulties with their use. Often, a user must simultaneously orient the transit to the object being measured, level the transit in the horizontal plane for strike measurements while maintaining the orientation of the transit and take the strike reading. This is even compounded for dip measurements where the orientation must be maintained while the vernier is adjusted until the bubble level is leveled and then the measurement taken while the orientation and level is maintained. Since the measurements must be read from gauges inside of the transit, accurate measurements can be difficult to obtain, not due to the precision of the instrument but due to the awkwardness and/or difficulty in the user making the measurements, particularly in measuring geological formations.

These problems also present themselves in the use of compasses. Compasses have some of the same difficulty in taking directional measurements. In order for a user to make an accurate reading, the compass must be oriented in the appropriate direction or to the desired structure, held level and the reading taken. This can be difficult for inexperienced users and even for experienced users in difficult situations.

Often times in making these precise measurements in difficult situation, a user must have extensive prior experience or another person must be involved. Thus there is presently a need for a pocket transit or even a compass that will enable a user to take a precise measurement without the difficulty of the prior devices.

SUMMARY OF THE INVENTION

The present invention solves these problems and others by providing a pocket transit and/or a compass that can be easily used to provide accurate measurements. The pocket transit of the present invention provides several features that allow a user, even an inexperienced user, to take precision measurements easily and accurately.

One such feature of the present invention enables a user to take a strike measurement accurately and easily. The present invention, in a preferred embodiment provides a pocket transit that has a locking mechanism that locks the movement of the needle assembly. The locking mechanism enables a user to lock the needle assembly of the transit in place to prevent movement of the needle assembly. Then the user may momentarily release the locked needle assembly to enable an azimuth or strike measurement to be taken. The user then allows the locking mechanism to lock the needle assembly in the measured position for viewing.

The locking mechanism, in a preferred embodiment, includes a lever mounted on the underside of the transit that is rotatable to lock and unlock the needle assembly of the transit. When the needle assembly is in the locked position, the user simply presses a button on the upper side of the transit to momentarily release the needle assembly to allow a measurement to be taken. Release of the button causes the locking mechanism to once again lock the needle assembly. Thus, a user only needs to orient the transit to the structure, make sure the transit is level and press and release the button. The measurement is locked in place at that time. The user can then view the measurement without concern of the orientation and leveling of the transit.

This feature is further enhanced by improved leveling devices on the transit. The transit of a preferred embodiment of the present invention includes long bubble levels incorporated in the sidewalls of the transit. This allows the transit to be used by viewing either from the sides or underside of the transit as well as from above. Previously, the user was forced to view the transit from above to ensure that the transit was level. This enables the user to use the transit in situations not previously possible.

The transit of a preferred embodiment of the present invention also includes an induction dampened needle for quick accurate readings. Also, the use of a sapphire jewel bearing increases the smoothness of the needle movement. These features combine with the above described features that allows a user to make quick, accurate readings even in situations where the face of the transit is not easily viewable.

The transit of the preferred embodiment also provides additional features to increase the ease of use of the transit for measuring vertical angles such as dips. One such feature is a unique hinge mechanism between the cover and the transit body. This unique hinge mechanism includes clinometer dials incorporated in the sidewalls of the cover. The clinometer dials enable the angle between the cover and the transit body to be accurately measured. The user is able to hold the transit body level, align the object to be measured in the sights of the cover and the sight arm to determine the vertical angle or grade of the object. Previously, the user would need to align the object in the sights, adjust the vernier until the vernier bubble level was horizontal, and take the reading from the vernier scale or grade scale, all the while maintaining the orientation and level of the transit.

The use of these features, taken alone and in combination with one another provides a transit and/or compass that is greatly improved over prior devices and that enable a user to easily and quickly take accurate measurements.

These and other features are evident from the ensuing detailed description of preferred embodiments and from the drawings.

DETAILED DESCRIPTION OF PREFERRED EMBODIMENTS

A preferred embodiment of the present invention is illustrated in FIGS. 1–5. It is to be expressly understood that the descriptive embodiments are provided herein for explanatory purposes only and is not meant to unduly limit the claimed inventions. The preferred embodiment of the present invention includes a pocket transit for use in geoscience purposes, such as geology, surveying, forestry, engineering, orienteering and other activities. The pocket transit includes a magnetic compass and an inclinometer. In the preferred embodiment, the transit of the present invention is usable as surveyor's compass, prismatic compass, clinometer, hand level and a plumb. It is to be expressly understood that while the preferred embodiment is discussed as a transit, other embodiments of the present invention include compasses in various forms.

Figure 1:
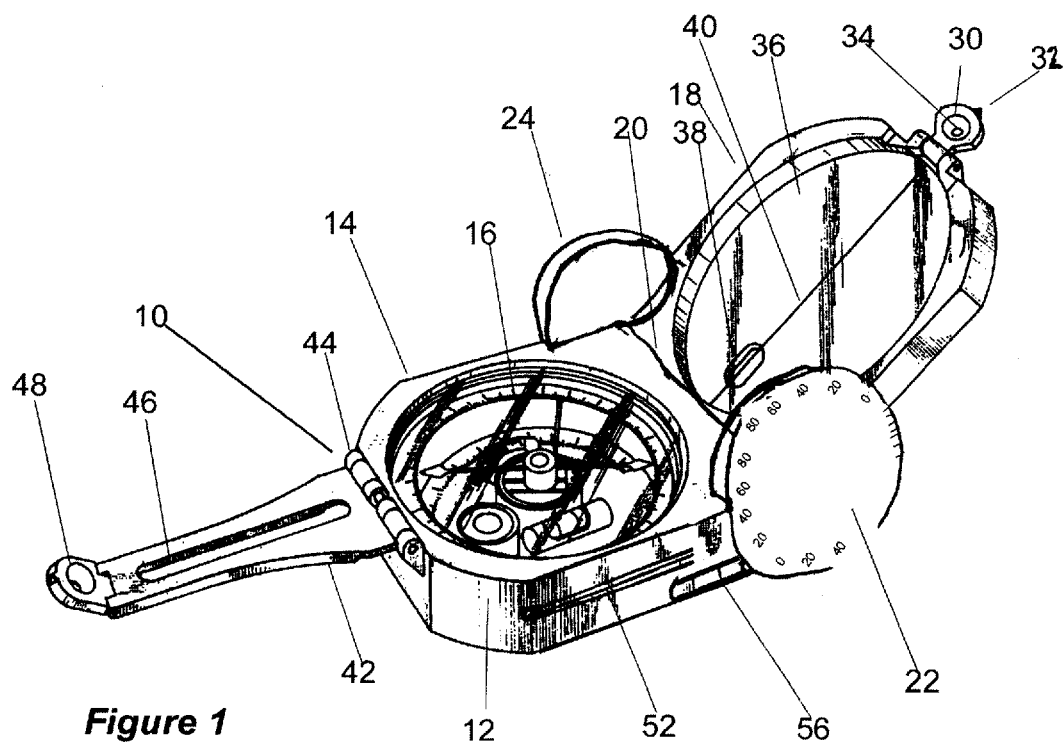
FIG. 1 shows a left side perspective of a preferred embodiment of the transit of present invention.
Figure 2:
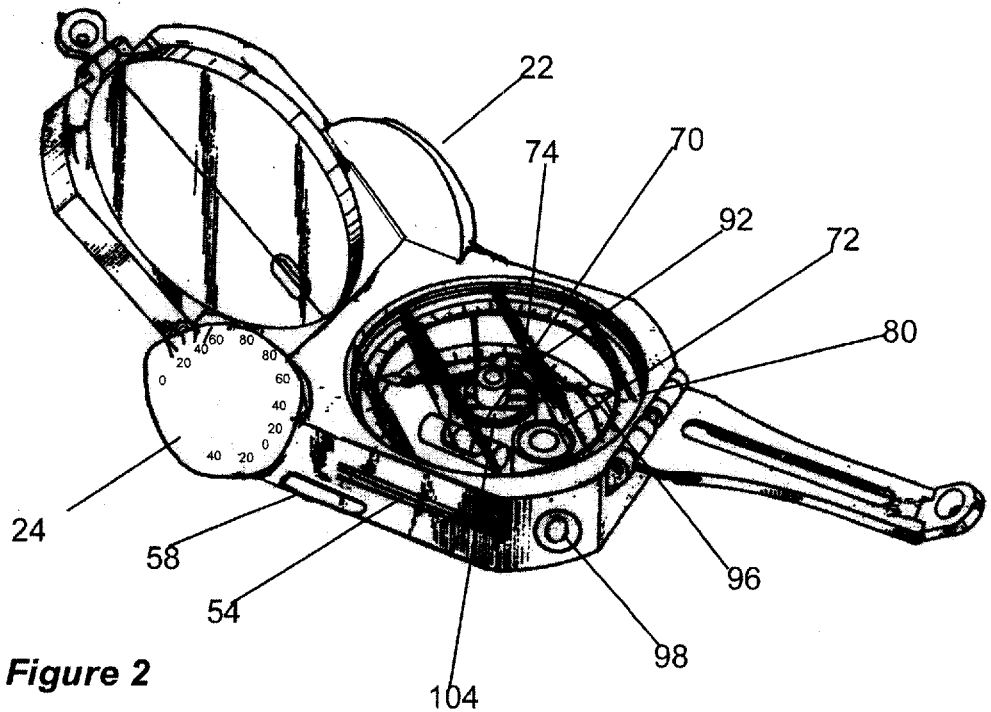
FIG. 2 shows a right side perspective of the embodiment of FIG. 1.

The transit 10, shown in FIG. 1, is shown in the form of a portable or hand-held instrument. The housing 12 includes an annular body 14 with a transparent top 16 of a clear glass or plastic material, and a cover 18. In the preferred embodiment, the annular body 14 and cover 18 are formed from a machined aluminum billet (such as 6061-T6 aluminum) that is hard anodized and nearly indestructible. It is to be expressly understood that other materials may be used as well. The cover 18 and annular body 14 are connected by hinge 20. The hinge 20 includes inclinometer dials 22 and 24 (as shown in FIGS. 1 and 2) attached at the sides of the hinge 20, as discussed in greater detail below. The inclinometer dials 22, 24 are graduated in one degree increments and are able to provide angular measurements to two hundred twenty-five degrees. The hinge 20 allows relative movement between the cover 18 and body 14 from a closed position to open positions up to two hundred twenty-five degrees from the closed position.

The cover 18 includes a small sight 30 pivotally connected at the outer end of the cover. A jaw-like clasp 32 is pivotally secured to the small sight 30 for securing the cover 18 to the body 14 when the cover is closed. The small sight 30 also includes sight hole 34. In this preferred embodiment of the present invention, the sight hole includes a "Buck Horn" or double sight. The cover 18 also includes mirror 36 mounted on the inside of the cover 18 for use in prismatic sighting. A sight hole 38 is formed in the mirror 36 and cover 18. Also, center line 40 extends across the center of the mirror 36.

Sight arm 42 is connected to body 14 at the opposing end of the body 14 and the cover 18 by hinge 44. The sight arm 42 includes an elongated slot 46. Peep sight 48 is pivotally connected at the free end of the sight arm 42. In the preferred embodiment, the peep sight includes a "Buck Horn" or double sight for increased field of view when sighting azimuth or vertical angles. The sight arm 42, slot 46 and peep sight 48 are aligned with the centerline 40 of the mirror 36, the sight hole 48 and the sight hole 34 of the small sight 30 to enable the transit 10 to be used in various sighting modes.

The sight arm 42 is foldable over the body 14, and the cover 18 can be closed over the folded sight arm 42 and body 14 with the small sight 30 pivoted inwardly within the cover 18 such that the clasp 32 is engageable with the hinge 44 to retain the cover in the closed position.

Slots 52, 54 are formed on opposing sides of the body 14 to allow the transit to be attached to a tripod for precision use. The slots 52, 54 extend substantially the entire width of the transit 10 to ensure that the transit is mounted on the tripod so that the pivot point of the tripod and transit are centrally mounted.

The transit of the preferred embodiment of the present invention includes long bubble levels 56, 58 on opposing sides of the body 14 to allow ease of leveling of the compass for measuring dips and strikes. The bubble levels 56, 58 are easily and accurately viewable from the sides or bottom of the transit 10 rather than only the top as in earlier transits.

Figure 3:
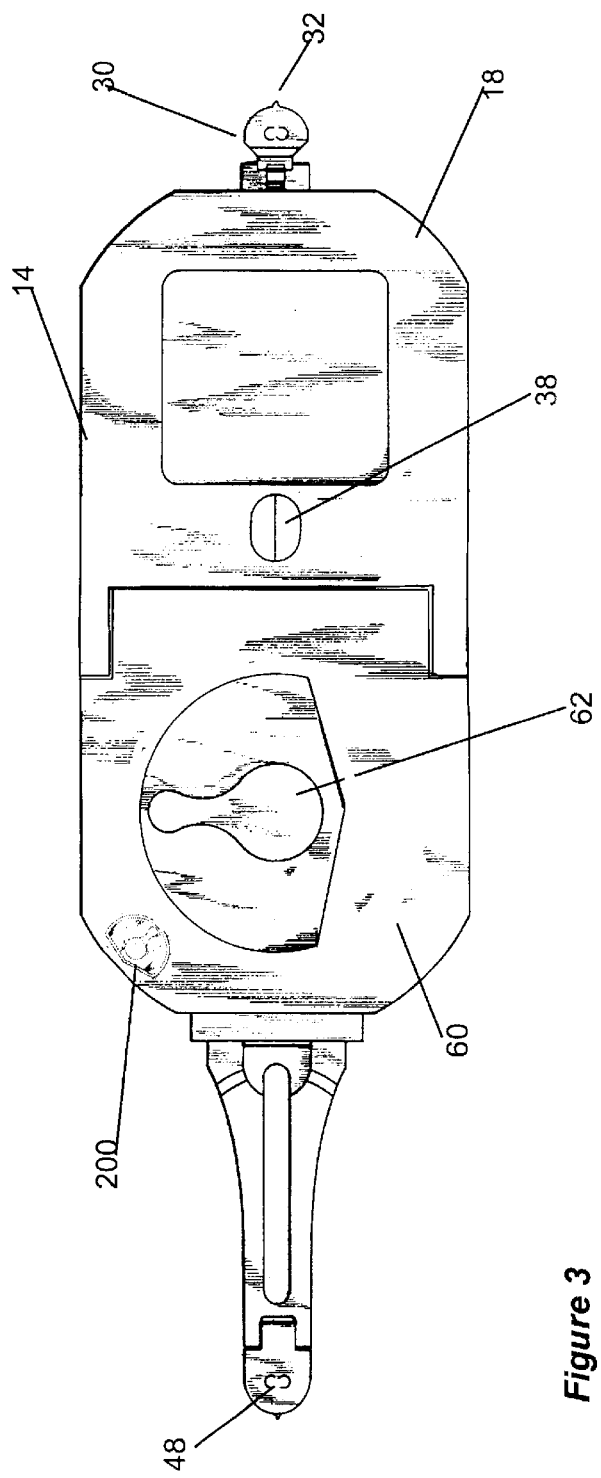
FIG. 3 shows a bottom view of the embodiment of FIG. 1.

The body 14 also includes a bottom surface 60 as shown in FIG. 3. A vernier adjustment lever 62 is rotatably mounted through the bottom surface and extends into the interior of the body 14.

The transit 10 also includes a bubble level 72 on the interior of the body 14 under the transparent cover 16. The bubble level 72 also is used to ensure that the transit is horizontally level when a direction or strike is taken. A long level 70 is also mounted within the interior of body 14 under the transparent cover 16. The long level 70 is used during inclinometer measurements and also when the transit is used as a level. A vernier scale 74 is also jointly mounted along with the bubble level 72 and long level 70 on a rotatable support 76 that is attached to the vernier adjustment lever 62. These particular features are similar to the features of the compass disclosed in U.S. Pat. Nos. 4,175,333; 4,700,490; and Des. 290,093, all assigned to the assignee of the present invention and incorporated herein by reference. It is to be expressly understood that other embodiments of the present invention may include other compass and inclinometer type of units.

In the preferred embodiment, the vernier scale 74 is provided with one degree graduations and ten minute readability. The vernier scale of the preferred embodiment provides accuracy to within plus or minus one-half degree. The Vertical angle measurements are provided to plus or minus ninety degrees and up to one hundred per cent grade. A grade scale is also provided along with the vernier scale to enable direct reading of the grade measurements. The grade scale is provided in a percent basis with increments of five percent.

An azimuth ring 80 is provided on the inner periphery of the body 14. In the preferred embodiment, the azimuth ring is gradated in one degree increments to provide accuracy within plus or minus one-half degree. The transparent cover glass top 16 is firmly seated against a seat 66 on the inner periphery of the body 14 against an O-ring seal retainer 68. The cover glass top 16 is secured in place by a retaining ring that is inserted in a groove along the upper wall of the body 14.

Figure 4:
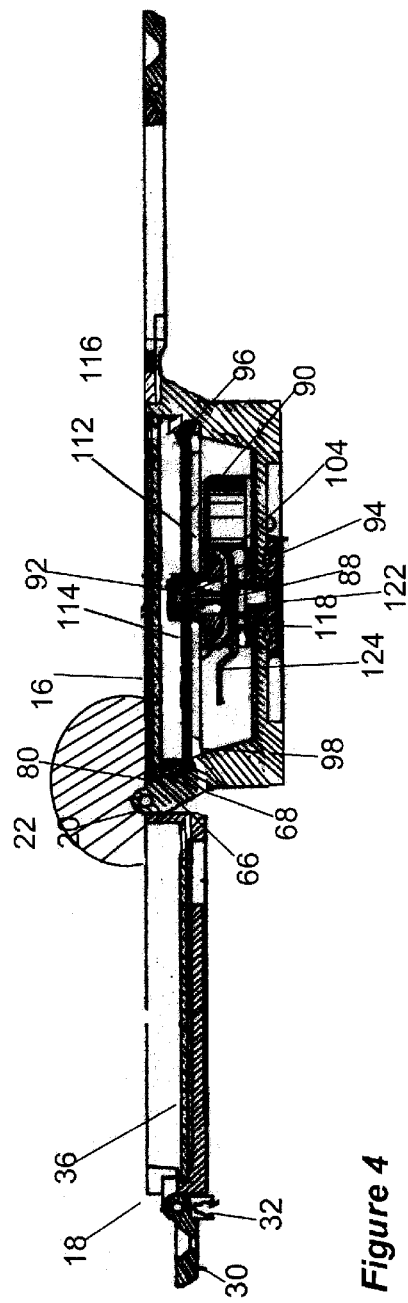
FIG. 4 shows a side cross-section of the embodiment of FIG. 1.

In the preferred embodiment, shown in FIG. 4, a pivot pin 88 projects upwardly from the center of the floor of the body 14. The upper extremity of the pivot pin 88 supports a magnetic needle pointer assembly 90 comprised of a center cap 92 of an inverted cup-shaped configuration and a jewel bearing 94 disposed centrally within the cap 92. In the preferred embodiment, the jewel bearing 94 includes a sapphire jewel bearing for smooth movement by the needle assembly 90.

Two diametrically opposed pointer arms 96, 98 project from the lower end of the cap 92 to terminate in respective needle tips 100, 102. An annular magnetic disk 104 is disposed in closely spaced relation beneath the respective proximal portions of the pointer arms 50, 52. The annular magnetic disk 104 has an upper annular extension 106 affixed to the underside of the cap 92 and suspended therefrom. The magnetic disk, in the preferred embodiment is a single NdFeB magnet that resists demagnetization better than most magnets. The jewel bearing 94 is positioned at the upper extremity of the extension 106 within the cap 92 to rest on the upper tip of the pivot pin 88. The disk 104 has a chordal or flat surface portion 108 in its outer periphery and a tapered undersurface 110. The pointer arm 96 that points to the north is aligned to extend radially across the center of the flatted surface 108, as viewed from above, to offset or counterbalance the effect of tipping caused by the earth's magnetic field Declination adjustment screw 98 is also provided extending into the body 14 to rotate the azimuth ring 80 to adjust for magnetic declination. Magnetic declination, as is well known, is the difference between true geographic north and magnetic north with respect to the position of the user of the transit.

In the preferred embodiment, the damper pan assembly is disposed beneath the pointer assembly 90. The damper pan assembly 112 includes a damper pan 114 having an upwardly projecting outer wall 116 and a floor or base 118 with a central orifice 120. A central sleeve 122 concentric with the central orifice 120 of the base 118 projects upwardly through the hollow interior of the pan 114 a distance greater than the upward projection of the outer wall 116. The pivot pin 88 extends through the orifice 120 of the base 118 and the sleeve 122 to support the jewel bearing 94.

The damper pan assembly further includes an externally accessible lift mechanism to selectively move the sleeve 122 to lift the pointer assembly 90 and jewel bearing 94 off of the pivot pin 88. Once the pointer assembly 90 and jewel bearing 94 are lifted off of the pivot pin 88, the pointer assembly is "locked" from movement. In the preferred embodiment, shown in FIG. 4, the lift mechanism includes a lift arm 124 extending from beneath the base 118 of the pan 114 to rest on a flat wall surface 126 that is spaced inwardly from the outer periphery of the body 14. Upward movement of the lift arm adjacent the pan 114 lifts the pointer assembly 90 off of the pivot pin 88. Downward movement of the lift arm to the normal position of the lift arm 124 rests the pointer assembly 90 onto the pivot pin 88.

Figure 5:
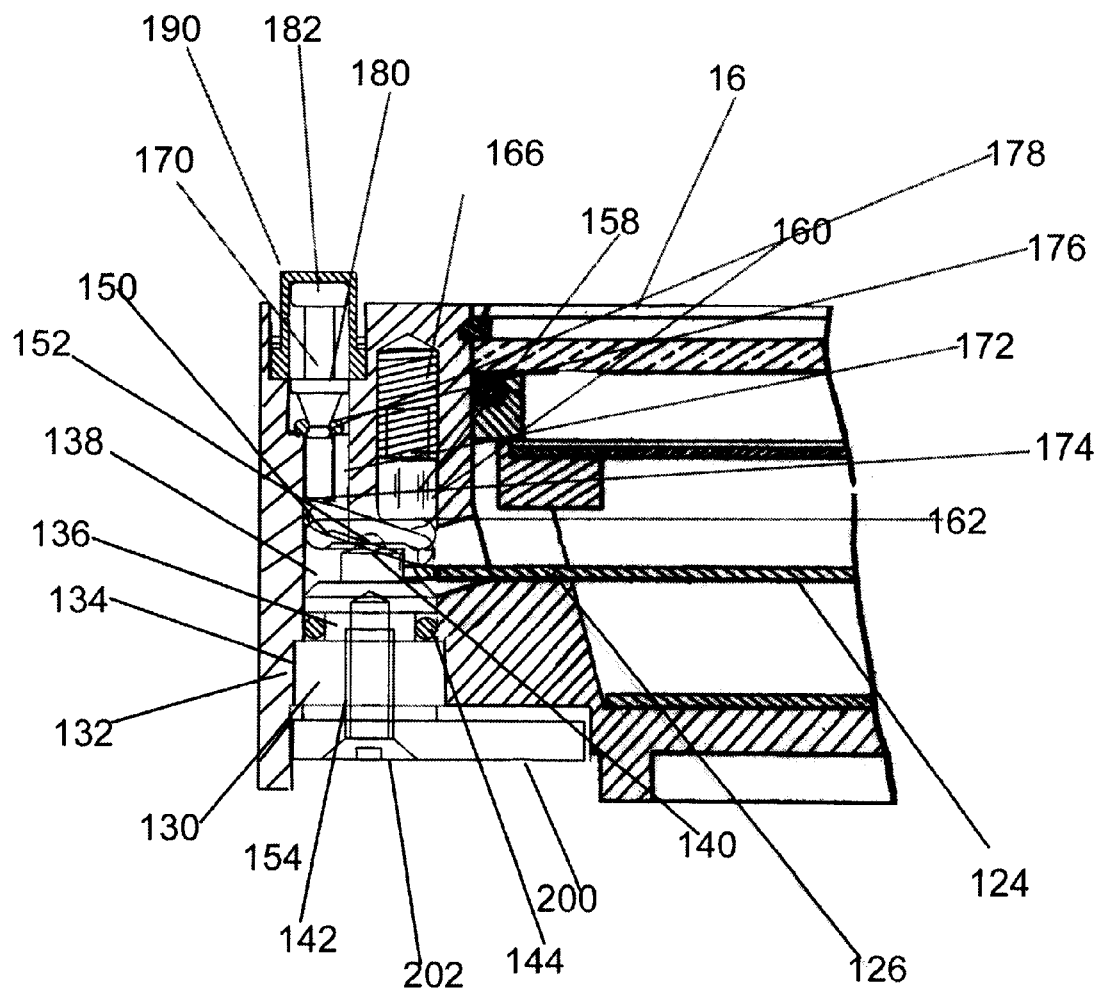
FIG. 5 shows a detail view of the lift mechanism of the embodiment of FIG. 1.

As shown in FIG. 5, a pivot bushing 132 is mounted in vertical bore 130 in body 14 adjacent the outer edge of lift arm 124. The pivot bushing 132 includes a lower threaded portion 134 for engagement with threads in the vertical bore 132, an annular O-ring groove 136 and a chamfered seat 138. Spherical member 140 extends above the chamfered seat 138. An inner bore 142 extends within pivot bushing 132 with a hex shaped entry portion for engagement with an Allen wrench. O-ring 144 is mounted onto groove 136 and the pivot bushing 132 is inserted into the bore 130 by the threaded engagement with the threads of the bore 132 until the chamfered seat 138 is adjacent the lower surface of lift arm 124.

Lever 200 is attached to pivot bushing 132 by screw 202. The lever 200 is rotated from the underside of body 14. As the lever 200 is rotated, the pivot bushing 132 is moved up and down due to the threaded engagement between the pivot bushing 132 and the bore 130.

Swash plate 150 includes a spherical seat 152 that seats onto spherical member 140 of the pivot bushing 132. The outer lower circumferential edge 154 of the swash plate 150 is of a greater thickness than the center portion of the swash plate to allow edge 154 to pivot downwardly against lift arm 124 to engage the lift arm against chamfered seat 138. Plunger 160 extends downwardly from bore 158 of the body 14 so that the conically-shaped head 162 presses downwardly against swash plate 150. Compression spring 166 biases the plunger 160 downwardly against the swash plate 150 that in turn presses downwardly against the free end of the lift arm 124. In the normal position, the swash plate 150 extends horizontally and the lift arm 124 allows the pointer assembly 90 to freely operate.

Lift pin 170 is slidably mounted in bore 164 of body 14. Lift pin 170 includes a first elongated portion 172 that is slidable within first diametrical portion 166 of bore 164. The lower edge 174 of the lift pin 170 engages against the upper surface 156 of swash plate 150. V-shaped groove 176 extends above the first elongated portion 172 and normally extends above the first diametrical portion 166. O-ring 178 seats in V-shaped groove 176 to hold the lift pin 170 in a normal position so that swash plate 150 engages against the lift arm 124. The O-ring 178 not only acts as a resilient biasing force but also seals the inner portions of the transit from contamination. The lift pin 170 extends upwardly from the V-shaped groove 176 to a diametrical portion 180. A head portion 182 of lift pin 170 extends above the upper surface of the body 14 when the lift arm 124 is in the downward position, allowing the pointer needle assembly 90 operates freely. A rubber bellows 190 extends over the head portion 182 and downward into the bore 164.

The components of the lift mechanism are preferably made of brass alloy to prevent magnetic disruption of the operation of the compass and to minimize corrosion. The use of the O-rings also seals from contamination of the inner workings of the transit.

The lift pin 170 and the lever 200 are used in conjunction with one another to provide to allow strike measurements to be taken "blindly". The lever 200 is rotated to move the pivot bushing 132 downward so that the swash plate 150 engages against plunger pin 150 that in turns presses the free end of the lift arm 124 against the wall 126 of the body in a cantilever fashion to cause the lift arm 124 adjacent the damper pan assembly to move upward to disengage the pointer needle assembly 90 from the pivot pin 88. As the swash plate 150 pushes upward against the plunger pin 160 causing the spring 166 to compress and force the swash plate 150 to pivot downwardly on the one side against the lift arm 124 and upwardly on the opposing end against the lift pin 170.

Thus, the pointer assembly is prevented from movement at this point. The user can momentarily release the pointer assembly by pressing downward on the bellows 190. The user presses downwardly on bellows 190 to move the lift pin 170 downward against the upper surface of the swash plate 150. As the bellows 190 is pressed downwardly, it forces the lift pin 170 downwardly in bore 164. O-ring 178 is pressed upwardly against the sides of V-shaped groove 176. The lower end 174 of the lift pin 170 presses against the upper surface 156 of the swash plate 150, forcing it downwardly. This causes the opposing side of swash plate 150 to pivot upwardly against the plunger pin 160, causing the spring 166 to compress. The free end of the lift arm 124 rises upward from the release of the pressure. The upward movement of lift arm 124 from the side wall 126 effectively lowers the damper pan 114 to the pointer assembly 90 and jewel bearing 94 onto the pivot pin 88. This allows the pointer needle assembly 90 to rotate relative to the magnetic effects. This allows a strike to be taken.

The user then releases pressure from the bellows to lock the pointer needle position into the measured position. As pressure is released against the bellows 190, the lift pin 170 lifts upward due to the bias from the compressed spring 166 against the plunger pin 160 pivoting the swash plate upward against the lift pin and from the "spring" action of the O-ring 178 pushing downward on the V-shaped groove 176. The swash plate 150 pivots downward against the free end of the lift arm 124 to create a cantilever force once again to raise the damper pan assembly and lock the pointer needle assembly in position.

Thus the user can take a strike measurement by simply pressing the bellows and releasing. The strike measurement is taken and locked for reading. It is not necessary for the user to attempt to view the strike reading during the measuring process, which often times can be difficult to do.

This feature is also particularly useful in compasses as well. A user is able to quickly and accurately take a directional measurement by simply aligning the compass with the object, hold the compass level and release the needle for taking a reading by pressing the button. Release of the button or bellows then freezes the reading for ease of viewing. This is particularly useful for orienteering or other situations where precise readings are required in a short time.

Other features of the preferred embodiment of the present invention also provide increased ease of use of the transit. These include the external long-level bubbles on the side walls of the body 14 to allow the transit to be leveled in a horizontal plane by viewing from the sides or even the bottom of the transit, as opposed to the previous transits that required viewing of a level within the transit.

The use of the clinometer dials on the sides of the hinge between the cover and the body also greatly increase the ease of use of the transit along with increased accuracy. Dips can be easily measured by the use of these dials, as opposed to previous clinometers mounted within the transit. The object for which the dip is to be measured in aligned in the sights by angling the cover relative to the body. Once the object is properly aligned, with the body being held in a horizontal plane, the vertical angle can be measured from the cover relative to the clinometer dials.

While the embodiment shown is portable and hand-held as described, it is to be understood that the present invention is readily usable with various sizes and types of compasses or transits. Thus, the embodiment here shown is meant to be descriptive and not limiting, with the scope of the invention being defined in the claims which follow.

What is claimed is:

1. A compass, said compass comprising:

a needle assembly for indicating directions;

a mounting mechanism for said needle assembly for allowing said needle assembly to be moved from a first position where said needle assembly is freely movable and a second position where said needle assembly is locked from movement;

a locking mechanism for moving said needle assembly from said first position to said second position; and a release mechanism for momentarily releasing said needle assembly from said second position to allow a measurement to be taken and then returning said needle assembly to said second position.

2. The compass of claim 1 wherein said mounting mechanism includes:

a pivot pin for said needle assembly to balance on in said first position.

3. The compass of claim 2 wherein said locking mechanism includes:

a lift arm for lifting said needle assembly from said pivot pin to move said needle assembly to said second position.

4. The compass of claim 2 wherein said locking mechanism includes:

a lift arm for lifting said needle assembly from said pivot pin to move said needle assembly to said second position;

a pivot member that engages said lift arm; and an actuating member that forces said pivot member to engage said lift arm to cause said lift arm to lift said needle assembly from said pivot pin to move said needle assembly to said second position.

5. The compass of claim 4 wherein said actuating member includes:

a cam surface for engaging said pivot member; and lever for raising and lowering said cam surface relative to said pivot member.

6. The compass of claim 4 wherein said release mechanism includes:

a slidable member movable under pressure from a user from a first position away from said pivot member to a second position that engages said pivot member to move said pivot member away from said lift arm to allow said needle assembly to return to said first position of said needle assembly.

7. The compass of claim 6 wherein said release mechanism further includes:

a resilient member to return said slidable member to said first position as the user releases pressure from said slidable member.

8. The compass of claim 1 wherein said release mechanism includes:

a resiliently-biased slidable member.

9. The compass of claim 1 wherein said compass further includes:
   a transit body for mounting said compass;
   an inclinometer mounted with said compass in said transit body.

10. The compass of claim 9 wherein said transit body further includes:
    a cover;
    a hinge for mounting said cover to said transit body; and
    at least one clinometer dial mounted to said hinge for measuring the degree of angle between said cover and said transit body.

11. The compass of claim 9 wherein said transit body includes:
    at least one leveling device mounted on the exterior of said transit body for indicating that said compass is in a horizontal plane.

12. The compass of claim 1 wherein said compass further includes:
    a body for mounting said needle assembly;
    at least one leveling device mounted on the exterior of said body for indicating that said compass is in a horizontal plane.

13. A transit for measuring strikes and dips, said transit comprising:
    an inclinometer mechanism for measuring dips;
    a needle assembly for measuring strikes;
    a mounting mechanism for mounting said needle assembly in a first position to enable said needle assembly to measure strikes and in a second position to lock said needle assembly in a fixed position;
    a locking mechanism for moving said needle assembly from said first position to said second position; and
    a release mechanism for momentarily releasing said needle assembly from said second position to allow a measurement to be taken and then returning said needle assembly to said second position.

14. The transit of claim 13 wherein said mounting mechanism includes:
    a pivot pin for said needle assembly to balance on in said first position.

15. The transit of claim 13 wherein said locking mechanism includes:
    a lift arm for lifting said needle assembly from said pivot pin to move said needle assembly to said second position.

16. The transit of claim 13 wherein said locking mechanism includes:
    a lift arm for lifting said needle assembly from said pivot pin to move said needle assembly to said second position;
    a pivot member that engages said lift arm; and
    an actuating member that forces said pivot member to engage said lift arm to cause said lift arm to lift said needle assembly from said pivot pin to move said needle assembly to said second position.

17. The transit of claim 16 wherein said actuating member includes:
    a cam surface for engaging said pivot member; and
    lever for raising and lowering said cam surface relative to said pivot member.

18. The transit of claim 16 wherein said release mechanism includes:
    a slidable member movable under pressure from a user from a first position away from said pivot member to a second position that engages said pivot member to move said pivot member away from said lift arm to allow said needle assembly to return to said first position of said needle assembly.

19. The transit of claim 18 wherein said release mechanism further includes:
    a resilient member to return said slidable member to said first position as tile user releases pressure from said slidable member.

20. The transit of claim 13 wherein said release mechanism includes:
    a resiliently-biased slidable member.

21. The transit of claim 13 wherein said inclinometer mechanism further includes:
    a cover;
    a hinge for mounting said cover to said transit; and
    at least one clinometer dial mounted to said hinge for measuring the degree of angle between said cover and said transit.

22. The transit of claim 13 wherein said transit further includes:
    a body for mounting said needle assembly;
    at least one leveling device mounted on the exterior of said body for indicating that said transit is in a horizontal plane.

23. A transit for measuring strikes and dips, said transit comprising:
    a cover;
    a body;
    a hinge for mounting said cover to said body;
    a leveling device;
    at least one clinometer dial mounted to said hinge for measuring the degree of angle between said cover and said body;
    a needle assembly for measuring strikes;
    a mounting mechanism for mounting said needle assembly in a first position to enable said needle assembly to measure strikes and in a second position to lock said needle assembly in a fixed position;
    a locking mechanism for moving said needle assembly from said first position to said second position; and
    a release mechanism for momentarily releasing said needle assembly from said second position to allow a measurement to be taken and then returning said needle assembly to said second position.

24. The transit of claim 23 wherein said mounting mechanism includes:
    a pivot pin for said needle assembly to balance on in said first position.

25. The transit of claim 23 wherein said locking mechanism includes:
    a lift arm for lifting said needle assembly from said pivot pin to move said needle assembly to said second position.

26. The transit of claim 23 wherein said locking mechanism includes:
    a lift arm for lifting said needle assembly from said pivot pin to move said needle assembly to said second position;
    a pivot member that engages said lift arm; and
    an actuating member that forces said pivot member to engage said lift arm to cause said lift arm to lift said needle assembly from said pivot pin to move said needle assembly to said second position.

27. The transit of claim 26 wherein said actuating member includes:

a cam surface for engaging said pivot member; and lever for raising and lowering said cam surface relative to said pivot member.

28. The transit of claim 23 wherein said release mechanism includes:

a resiliently-biased slidable member.

29. The transit of claim 23 wherein said release mechanism includes:

a slidable member movable under pressure from a user from a first position away from said pivot member to a second position that engages said pivot member to move said pivot member away from said lift arm to allow said needle assembly to return to said first position of said needle assembly.

30. The transit of claim 29 wherein said release mechanism further includes:

a resilient member to return said slidable member to said first position as the user releases pressure from said slidable member.

31. A transit for measuring strikes and dips wherein said transit comprises:

a body;

a needle assembly for measuring strikes mounted in said body;

at least one leveling device mounted on the exterior of said body for indicating that said needle assembly is in a horizontal plane;

a mounting mechanism for mounting said needle assembly in a first position to enable said needle assembly to measure strikes and in a second position to lock said needle assembly in a fixed position;

a locking mechanism for moving said needle assembly from said first position to said second position; and a release mechanism for momentarily releasing said needle assembly from said second position to allow a measurement to be taken and then returning said needle assembly to said second position.

32. The transit of claim 31 wherein said mounting mechanism includes:

a pivot pin for said needle assembly to balance on in said first position.

33. The transit of claim 32 wherein said locking mechanism includes:

a lift arm for lifting said needle assembly from said pivot pin to move said needle assembly to said second position.

34. The transit of claim 32 wherein said locking mechanism includes:

a lift arm for lifting said needle assembly from said pivot pin to move said needle assembly to said second position;

a pivot member that engages said lift arm; and an actuating member that forces said pivot member to engage said lift arm to cause said lift arm to lift said needle assembly from said pivot pin to move said needle assembly to said second position.

35. The transit of claim 34 wherein said actuating member includes:

a cam surface for engaging said pivot member; and lever for raising and lowering said cam surface relative to said pivot member.

36. The transit of claim 35 wherein said release mechanism includes:

a slidable member movable under pressure from a user from a first position away from said pivot member to a second position that engages said pivot member to move said pivot member away from said lift arm to allow said needle assembly to return to said first position of said needle assembly.

37. The transit of claim 36 wherein said release mechanism further includes:

a resilient member to return said slidable member to said first position as the user releases pressure from said slidable member.

38. The transit of claim 32 wherein said release mechanism includes:

a resiliently-biased slidable member.

* * * * *